US008060039B2

(12) United States Patent
Gibbs

(10) Patent No.: US 8,060,039 B2
(45) **Date of Patent: *Nov. 15, 2011**

(54) METHODS AND APPARATUS FOR REESTABLISHING A DATA CONNECTION WITH A WIRELESS COMMUNICATION NETWORK

(75) Inventor: Fraser C. Gibbs, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 256 days.

This patent is subject to a terminal disclaimer.

(21) Appl. No.: 12/414,252

(22) Filed: Mar. 30, 2009

(65) Prior Publication Data

US 2009/0180376 A1 Jul. 16, 2009

Related U.S. Application Data

(63) Continuation of application No. 11/937,215, filed on Nov. 8, 2007, now Pat. No. 7,529,527.

(51) Int. Cl.
*H01Q 11/12* (2006.01)
*H04B 1/04* (2006.01)

(52) U.S. Cl. ............... 455/127.1; 455/343.1; 455/432.1; 455/435.1; 455/550.1

(58) Field of Classification Search ............... 455/127.1, 455/343.1, 343.5, 343.6, 432.1, 435.1, 436, 455/550.1, 564, 572, 522, 510, 515; 370/229, 370/230, 310, 324, 331; 709/201, 203, 248, 709/250, 242
See application file for complete search history.

(56) References Cited

U.S. PATENT DOCUMENTS 5,926,468 A * 7/1999 Chapman et al. ............ 370/328
6,252,884 B1 6/2001 Hunter
6,671,511 B1 * 12/2003 Forssell et al. ............ 455/452.1
6,781,979 B1 8/2004 Ebata et al.
6,845,245 B2 * 1/2005 Hunzinger .................... 455/510
7,024,217 B2 4/2006 Hunzinger
7,051,104 B1 * 5/2006 Cheng .......................... 709/227
7,599,697 B2 * 10/2009 Kangas et al. ............ 455/452.1
2002/0082033 A1 * 6/2002 Lohtia et al. ................. 455/517

(Continued)

FOREIGN PATENT DOCUMENTS

WO 0054524 A1 9/2000
WO 0203725 A1 1/2002

OTHER PUBLICATIONS

PCT Search Report, PCT Application No. PCT/CA03/00954, Jun. 25, 2005.

(Continued)

*Primary Examiner* — Binh Tieu
(74) *Attorney, Agent, or Firm* — John J. Oskorep, Esq.

(57) ABSTRACT

Methods and apparatus for use in a wireless communication device for communications with a wireless communication network are described. In one illustrative technique, the wireless device sends a message to the wireless network which causes data connection parameters of a previous data connection to be reset. Preferably, the message is a disconnect frame. After the message is sent, the wireless device sends a request for a new data connection to the wireless network. Thereafter, the wireless device communicates data over the new data connection with use of new data connection parameters. The data connection parameters may include an encryption parameter. The actions may be performed in response to a communication failure, such as a device reset that occurs while being out-of-coverage.

20 Claims, 6 Drawing Sheets

Start (502)
Power On (504)
Identify In-Coverage Condition (506)
Transmit Disconnect Frame (508)
Transmit Attach Request (510)
Establish PDP Context (512)

U.S. PATENT DOCUMENTS

| | | | | |
|---|---|---|---|---|
| 2002/0151302 | A1* | 10/2002 | Schmidt et al. | 455/426 |
| 2004/0202112 | A1 | 10/2004 | McAllister et al. | |
| 2004/0202117 | A1 | 10/2004 | Wilson et al. | |
| 2005/0096064 | A1* | 5/2005 | Hunzinger | 455/452.2 |
| 2006/0116145 | A1* | 6/2006 | Hunzinger | 455/510 |

OTHER PUBLICATIONS

"Digital cellular telecommunications system(Phase2+); Security related network functions/GSM 03.20 Version 7.2.0 Release 1998", ETSI TS 100 929, Nov. 1999, p. 1-104, XP-002167429.

Yair Frankel, "Security Issues In A CDPD Wireless Network", IEEE Personal Communications, Aug. 1, 1995, p. 16-27, vol. 2 No. 4, IEEE Communications Society, New York, NY USA.

PCT Search Report for application PCT/CA03/00954, Jun. 25, 2005.

Frankel et al , "Security Issue in A CDPD Wireless Network", IEEE Personal Communications, Aug. 1, 1995, pp. 16-27, vol. 2 No. 4, IEEE Communications Society, New York, NY USA.

* cited by examiner

METHODS AND APPARATUS FOR REESTABLISHING A DATA CONNECTION WITH A WIRELESS COMMUNICATION NETWORK

CROSS-REFERENCE TO RELATED APPLICATIONS

This patent application is a continuation of and claims priority to U.S. continuation patent application entitled "Methods And Apparatus For Reestablishing A Data Connection With A Wireless Communication Network" having application Ser. No. 11/937,215 and filing date of 8 Nov. 2007, now U.S. Pat. No. 7,529,527, which claims priority to U.S. non-provisional patent application having application Ser. No. 10/602,969 and filing date of 24 Jun. 2003, now U.S. Pat. No. 7,313,371, which claims priority to U.S. provisional patent application having application No. 60/397,682 and filing date of 23 Jul. 2002, each application being hereby incorporated by reference herein.

BACKGROUND

1. Field of the Technology

The present disclosure relates generally to wireless communication devices and associated networks, and more particularly to mobile stations communicating data within wireless communication networks such as General Packet Radio Service (GPRS) networks.

2. Description of the Related Art

A wireless communication device, such as a mobile station, establishes a packet data protocol (PDP) context with a General Packet Radio service (GPRS) wireless network through a GPRS attach. The GPRS attach makes the wireless device known to the network by sending identification and routing area information. The wireless device goes from an idle state to a ready state if the GPRS attach is successful. During a GPRS attach procedure, encryption parameters are established between the wireless device and the GPRS network. When the data connection is reset correctly, both the wireless device and the GPRS network reset their respective encryption parameters.

During an out-of-coverage condition with the network, however, the wireless device may be powered off or reset. This will cause the wireless device to reset its data connection parameters (e.g. its encryption parameter), but the wireless network will fail to disconnect since the wireless device is out-of-coverage. When the wireless device re-enters network coverage and sends a GPRS attach in attempt to re-establish a PDP context, the encryption parameter of the wireless device is out-of-sync with the encryption parameter of the GPRS network. Thus, no encrypted data can be transmitted between the device and the network successfully, including PDP context requests.

Accordingly, there is a resulting need for methods and apparatus for reestablishing a data connection that overcomes the deficiencies of the prior art.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

Methods and apparatus for use in a wireless communication device for communications with a wireless communication network are described. In one illustrative technique, the wireless device sends a message to the wireless network which causes data connection parameters of a previous data connection to be reset. Preferably, the message is a disconnect frame. After the message is sent, the wireless device sends a request for a new data connection to the wireless network. Thereafter, the wireless device communicates data over the new data connection with use of new data connection parameters. The data connection parameters may include an encryption parameter. The actions may be performed in response to a communication failure, such as a device reset that occurs while being out-of-coverage. Advantageously, a data connection is substantially seamlessly maintained for the wireless device despite network connection complexities.

Figure 1:
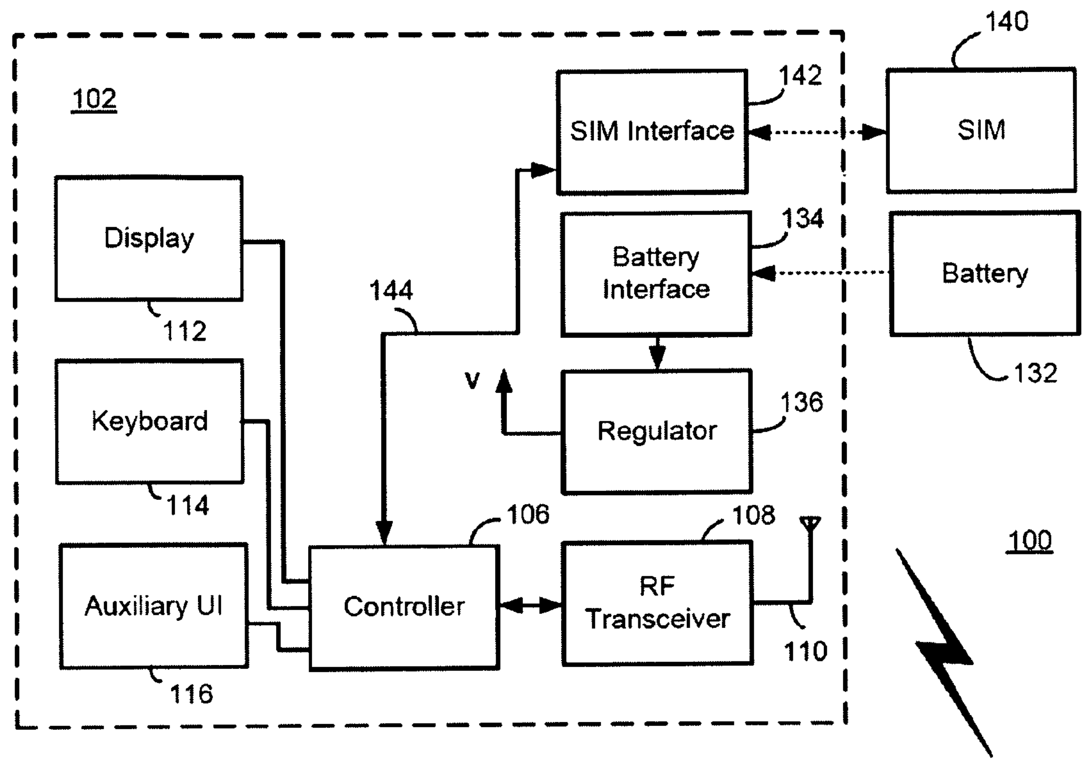
FIG. 1 is a block diagram which illustrates pertinent components of a wireless communication device which communicates within a wireless communication network.
Figure 1:
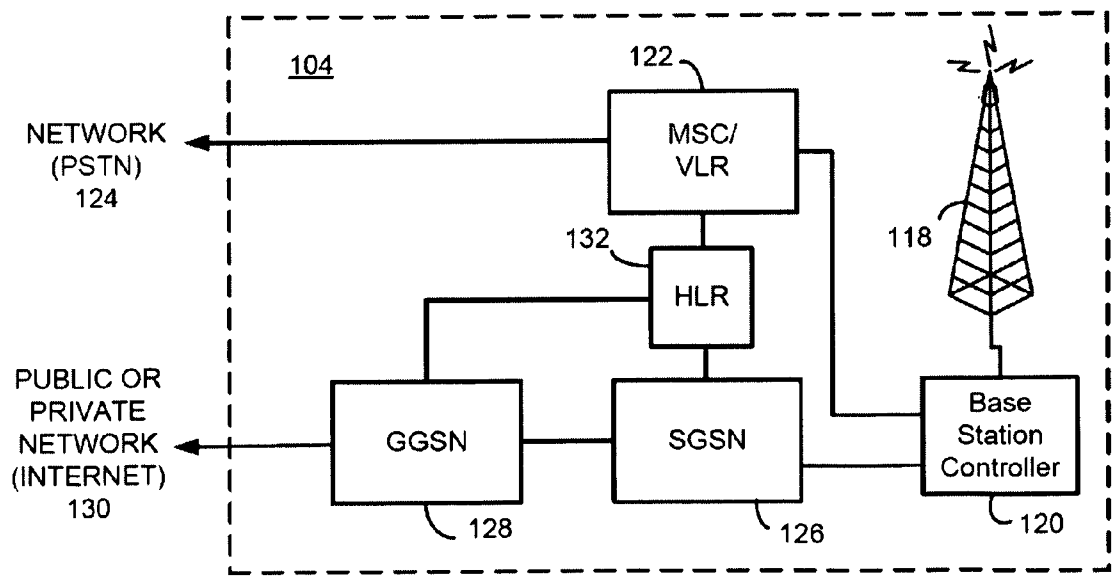

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 132 provides for a mechanical and electrical connection for battery 132. Battery interface 132 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 are together referred to herein as the fixed transceiver equipment. The fixed transceiver equipment provides wireless network coverage for a particular coverage area commonly referred to as a "cell". The fixed transceiver equipment transmits communication signals to and receives communication signals from mobile stations within its cell via station 118. The fixed transceiver equipment normally performs such functions as modulation and possibly encoding and/or encryption of signals to be transmitted to the mobile station in accordance with particular, usually predetermined, communication protocols and parameters, under control of its controller. The fixed transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the fixed transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
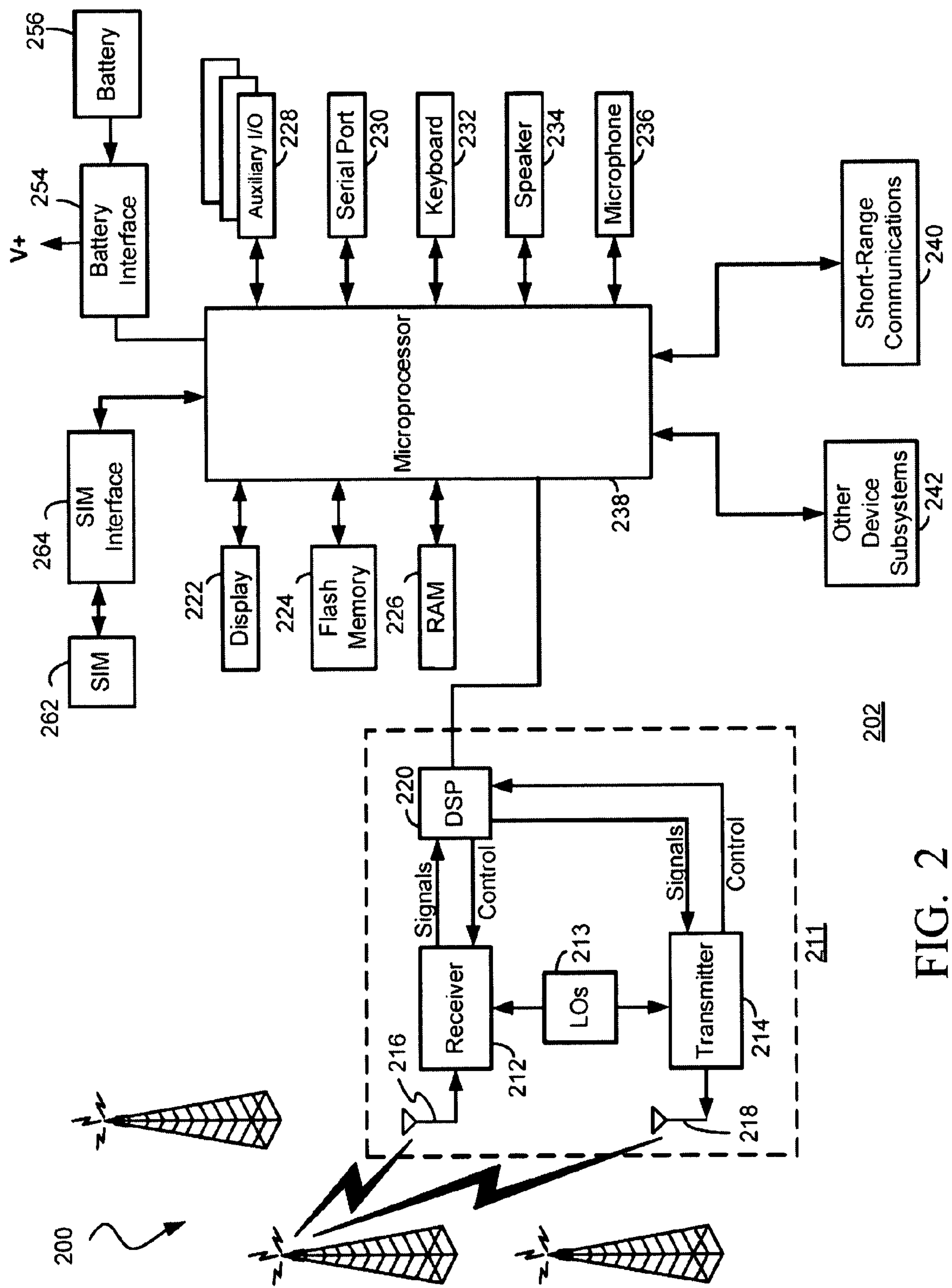
FIG. 2 is a more detailed diagram of a preferred wireless communication device of FIG. 1.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications (such as a network reestablishment scheme), will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
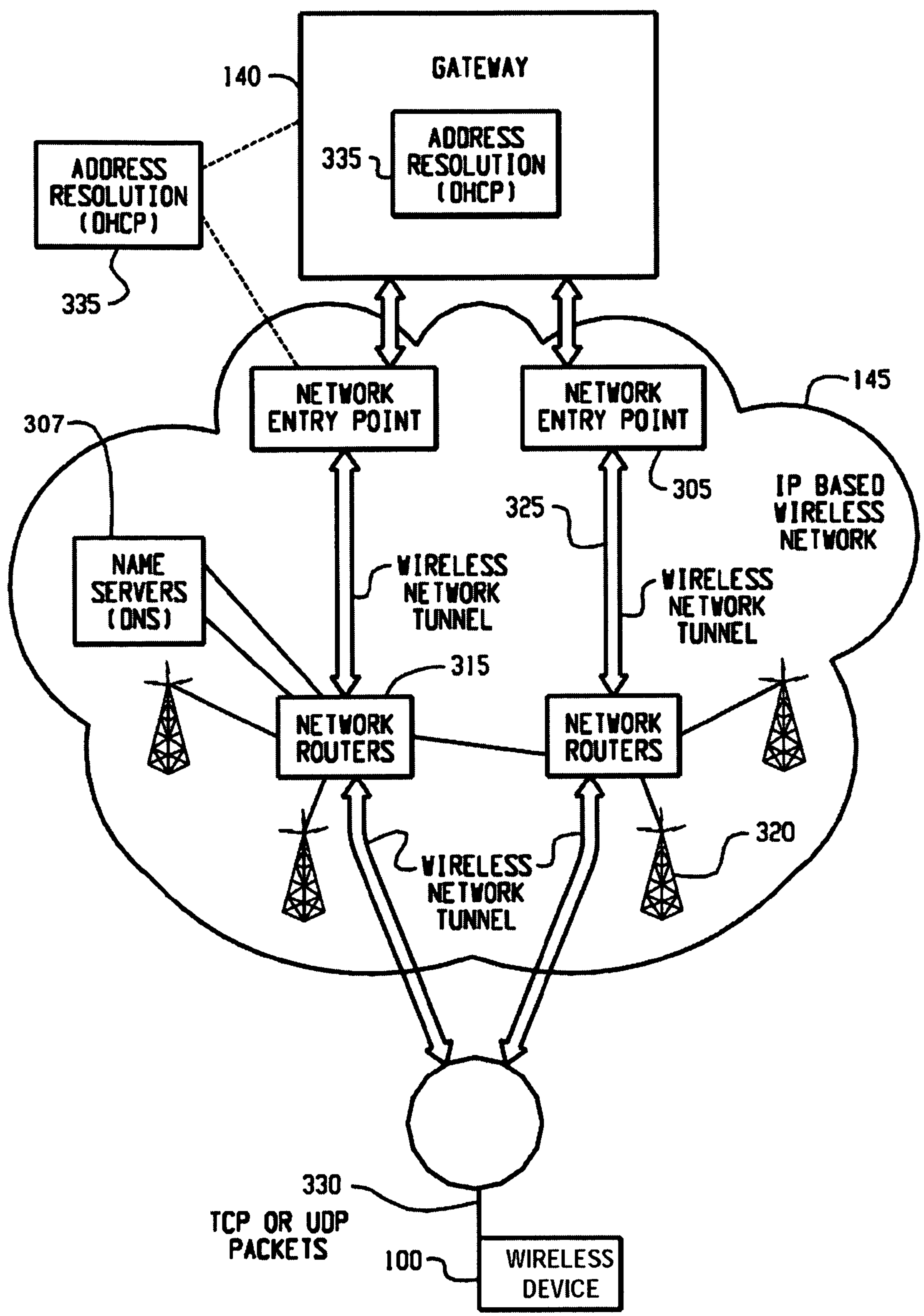
FIG. 3 is a particular structure of a system for communicating with the wireless communication device.

FIG. 3 shows a particular system structure for communicating with a mobile station. In particular, FIG. 3 shows basic components of an IP-based wireless data network which may be utilized. A mobile station 100 communicates with a wireless packet data network 145, and may also be capable of communicating with a wireless voice network (not shown). As shown in FIG. 3, a gateway 140 may be coupled to an internal or external address resolution component 335 and one or more network entry points 305. Data packets are transmitted from gateway 140, which is source of information to be transmitted to mobile station 100, through network 145 by setting up a wireless network tunnel 325 from gateway 140 to mobile station 100. In order to create this wireless tunnel 325, a unique network address is associated with mobile station 100. In an IP-based wireless network, however, network addresses are typically not permanently assigned to a particular mobile station 100 but instead are dynamically allocated on an as-needed basis. It is thus preferable for mobile station 100 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile stations such as mobile station 100.

Wireless network tunnels such as a wireless tunnel 325 are opened across wireless network 345 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile station 100 must use a specific technique associated with wireless network 345. The step of opening such a wireless tunnel 325 may require mobile station 100 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 100. When an IP address has been allocated to mobile station 100 and communicated to gateway 140, information can then be forwarded from gateway 140 to mobile station 100.

Wireless tunnel 325 typically has a limited life, depending on mobile station's 100 coverage profile and activity. Wireless network 145 will tear down wireless tunnel 325 after a certain period of inactivity or out-of-coverage period, in order to recapture resources held by this wireless tunnel 325 for other users. The main reason for this is to reclaim the IP address temporarily reserved for mobile station 100 when wireless tunnel 325 was first opened. Once the IP address is lost and wireless tunnel 325 is torn down, gateway 140 loses all ability to initiate IP data packets to mobile station 100, whether over Transmission Control Protocol (TCP) or over User Datagram Protocol (UDP).

Figure 4:
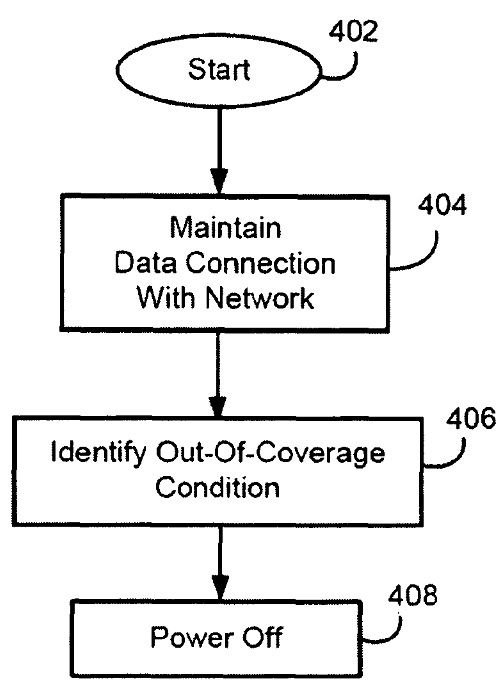
FIGS. 4 and 5 are flowcharts which describe a method of reestablishing a data connection with a wireless communication network.
Figure 5:
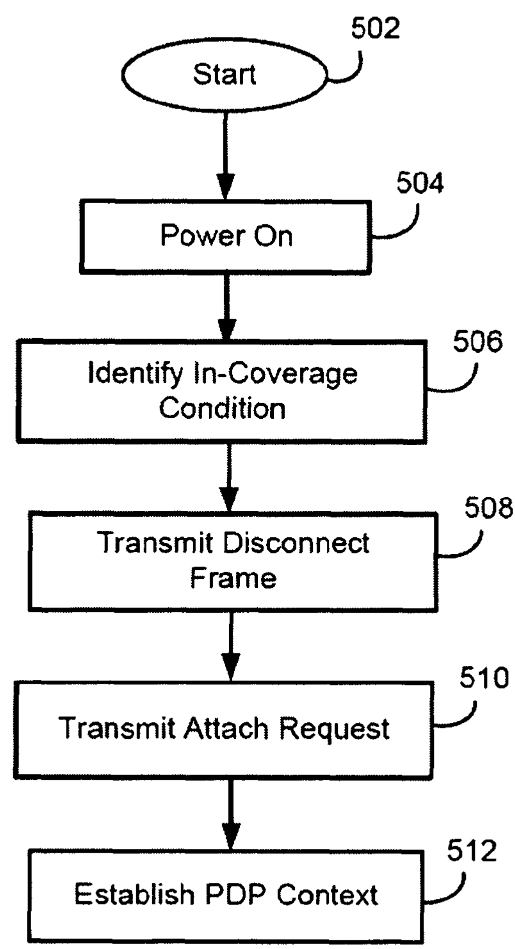

FIGS. 4 and 5 are flowcharts which describe a method of re-establishing a data connection with a wireless communication network. The flowchart of FIG. 4 pertains to device operation prior to the wireless device being powered off, and the flowchart of FIG. 5 pertains to device operation after the wireless device is powered back on.

Beginning at a start block 402 of FIG. 4, a wireless device (e.g. a mobile station) maintains a data connection with a wireless communication network (step 404). During the establishment of the data connection, encryption parameters between the wireless device and the network are established. In this particular embodiment, the data connection involves both an attachment and a PDP context between the wireless device and the network. In general, an "attach" means that the wireless device is registered to the network. An attach also allows for mobility (i.e. the network is able to track the wireless device's movements). Furthermore, the wireless device is authenticated and ciphering is enabled. When a Packet Data Protocol (PDP) context is activated, an IP address is assigned for the wireless device and subscriber-related parameters are provided so that data is capable of being transferred. When a data application on the wireless device is activated, for example, a PDP context between the between the wireless device and the network is created. When the application is terminated, the PDP context ends but the registration to the wireless network remains.

Sometime after the data connection is established, the wireless device experiences a particular set of events. For one, the wireless device identifies an out-of coverage condition with the network (step 406). The wireless device may be out-of-coverage when, for example, the device can no longer successfully send or receive data through the wireless network. While being out-of-coverage, the wireless device is powered off (step 408). The powering off may be due to, for example, a manual actuation of an ON/OFF switch on the wireless device, an automatic powering off of the wireless device, or an inadvertent reset which the wireless device experiences.

Since the wireless device is informed that it is out-of-coverage, it does not transmit a "detach" request to the wireless network prior to being shut down. Alternatively, just before being powered-off the wireless device transmits a "detach" request which is not received by the network due to the out-of-coverage condition. The wireless device also resets its parameters for the data connection, including its encryption parameter. However, the network does not reset its corresponding network parameters for the unreleased data connection. When the encryption parameter on the device is reset, it is out-of-sync with the encryption parameter of the wireless network.

Beginning at a start block 502 of FIG. 5, the wireless device is powered back on (step 504). The powering back on may be due to, for example, a manual actuation of an ON/OFF switch on the wireless device, an automatic powering on of the wireless device, or an inadvertent reset which the wireless device experiences. Next, the wireless device identifies an in-coverage condition with the wireless network (step 506). Conventionally, in this situation the wireless device transmits an attach request followed by the transmission of a PDP context request. In at least some networks, however, no data communication is thereafter possible because the network did not reset the former data connection and still maintains the previous encryption parameter.

In the present disclosure, the wireless device transmits a disconnect frame message to the wireless network (step 508) prior to establishment of an attach and PDP context. This disconnect frame causes the wireless network to reset the former data connection between the wireless device and the network, including resetting the network parameters (e.g. the network encryption parameter) associated with the former data connection. Next, the wireless device transmits an attach request to the wireless network (step 510). Because the encryption parameters are now in sync, the wireless network can communicate with the wireless device. Finally, the wireless device transmits a PDP Context request and a PDP Context is thereafter established (step 512).

Figure 6:
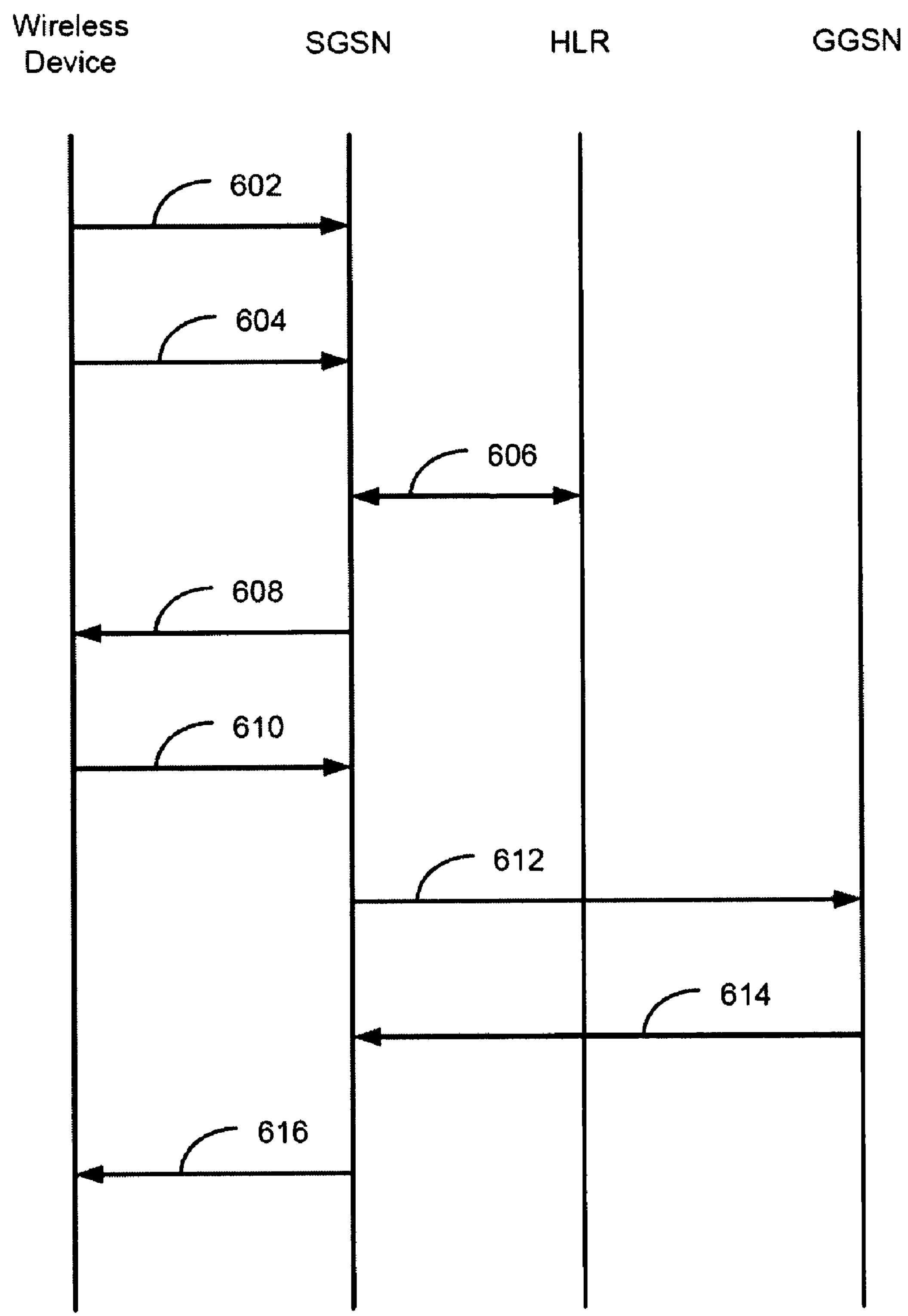
FIG. 6 is a system flow diagram relating to the method described in relation to FIGS. 4 and 5.

FIG. 6 is a system flow diagram depicting a system flow for reestablishing a data connection with a wireless network according to the present disclosure. Prior to the method outlined in FIG. 6, the wireless device communicates with an SGSN and, in turn, with a GGSN in a GPRS network through a base station. Sometime later, the wireless device goes out-of-coverage and cannot adequately communicate with any surrounding base station. While the wireless device is out-of-coverage, it loses power and its electrical circuitry is shut down. This shut down may be for a short or long period of time. Since the wireless device is informed that it is out-of-coverage, it does not transmit a "detach" request to the wireless network prior to being shut down. Alternatively, just before being powered-off the wireless device transmits a "detach" request which is not received by the network due to the out-of-coverage condition.

In accordance with the present disclosure, once the wireless device regains power and network coverage, it preferably transmits a disconnect frame to the GPRS network which reaches the SGSN (flow 602). In response, the GPRS network resets network parameters associated with the data connection (e.g. the encryption parameter) so that the wireless device and the network may communicate again. The wireless device then preferably transmits a GPRS Attach request to the GPRS network which reaches the SGSN (flow 604). In response, the SGSN informs the HLR of the attach and the HLR acknowledges it (flow 606). The SGSN then sends an acceptance of the attach to the wireless device (flow 608). Next, the wireless device transmits a PDP Context Request to the SGSN (flow 610). In response, the SGSN sends a request to the GGSN to create a PDP context (flow 612). Because the encryption parameters of the wireless device and the GGSN are now synchronized, the GGSN sends a response to the SGSN (flow 614). Subsequently, the SGSN sends an Accept message to the wireless device (flow 616). The data connection being fully established, the wire less device goes into a standby or ready mode.

Figure 7:
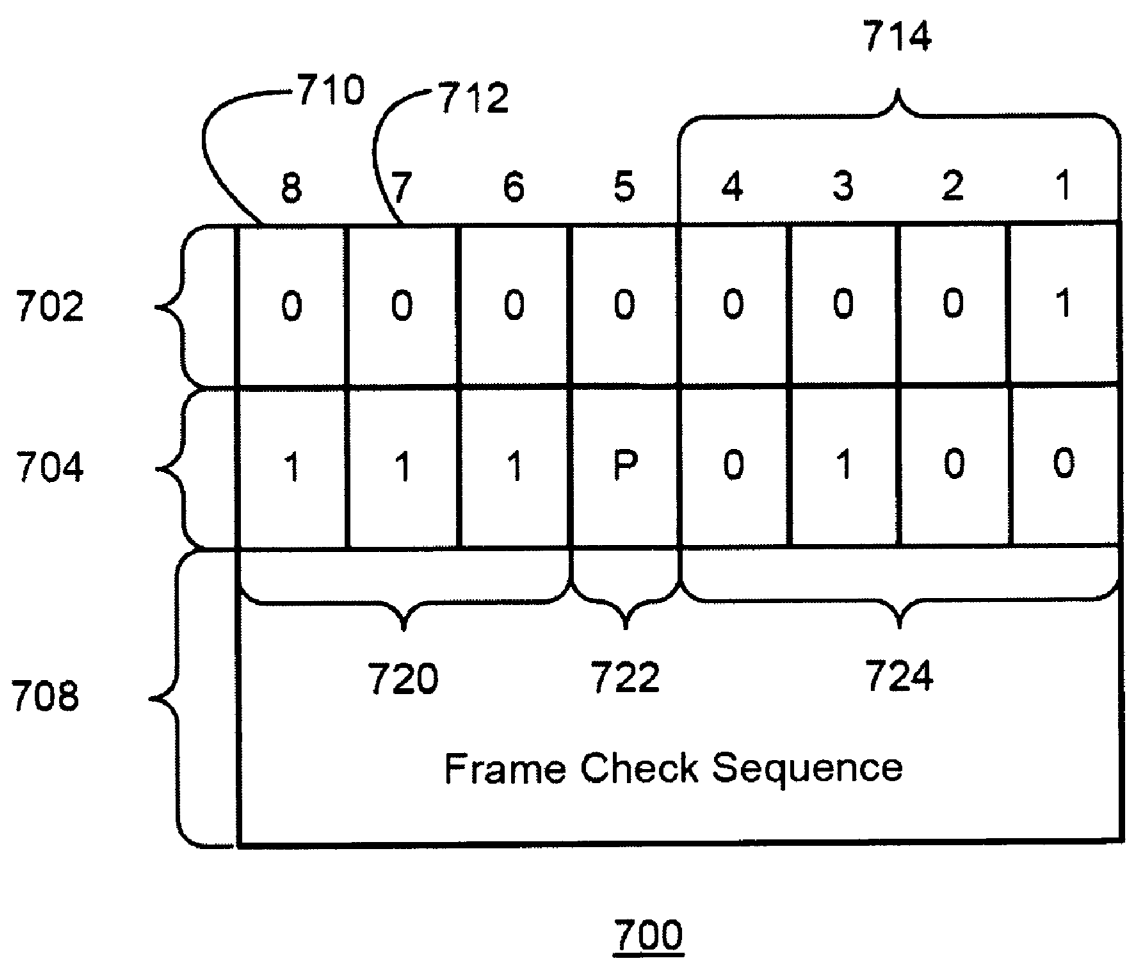
FIG. 7 is an illustration of the format of a disconnect frame which may be used to reset network parameters of the data connection.

FIG. 7 is a block diagram showing a GPRS disconnect frame 700 which may be transmitted by the wireless device when it returns to coverage after being reset during an out-of-coverage condition. In the present embodiment, this particular message causes network parameters associated with the old data connection to be reset so that a newly established data connection can be made. However, any suitable message may be utilized to achieve the same results depending on the network.

Disconnect frame 700 is defined in the specification Logical Link Control (LLC) Specification (GSM 04.64), which is used for packet transfer between the device and the serving SGSN. LLC layer exchanges are in frames. Disconnect frame 700 preferably consists of an address field 702, a control field 704, and a frame check sequence (FCS) 708. Address field 702 consists of a protocol discriminator (PD) bit 710, a command/response (CR) bit 712, and a service access point identifier (SAPI) 714. PD bit 710 indicates what protocol the frame is using. LLC frames set PD bit 710 to '0'. A frame with PD bit 710 set to '1' is invalid. CR bit 712 identifies a frame as being a command or a response. If the device sends a command to the network, CR bit 712 is set to '0'. If the network sends a command to the device, CR bit 712 is set to '1'. Since disconnect frame 700 is sent from the device, CR bit 712 in this embodiment is set to '0'. SAPI 714 identifies the data link controller identifier for which a frame is intended. In a disconnect frame, SAPI bits 1-4 are set to 1, 0, 0, 0, respectively. Control field 704 identifies the type of frame and typically consists of between one and three octets. In this case, because the frame is a control function, bits 8-6 220 are all set to '1'. Bit 5 722 is the poll or final bit. When the frame is issued as a command, the bit is a poll bit. When the frame is issued as a response, the bit is final bit. In this embodiment, for a disconnect frame, the remaining bits 724, bits 1-4, are preferably set to 0, 0, 1, 0, respectively. Typically, LLC frames have an information field, which normally contains various commands and responses. In a disconnect frame, no information field is permitted. Frame check sequence (FCS) field 708 consists of a 24-bit cyclic redundancy check (CRC) code. CRC-25 is used to detect bit errors in the frame header and information fields. The frame check sequence is determined in the specification Logical Link Control (LLC) Specification (GSM 04.64).

Final Comments. What have been described are methods and apparatus for use in reestablishing a data connection with a wireless communication network. Initially, a wireless communication device maintains the data connection with the wireless communication network. During an out-of-coverage condition with the network, the wireless device is powered off. This causes the wireless device to reset its parameters associated with the data connection, but since the wireless device is out-of-coverage the wireless network will fail to disconnect. Preferably, after being powered back on and regaining network coverage, the wireless device transmits a message to the network which causes one or more network parameters associated with the data connection to be reset. Subsequently, the wireless device transmits one or more additional messages to the network for reestablishing the data connection. In the preferred embodiment, the data connection is a Packet Data Protocol (PDP) context with a General Packet Radio Service (GPRS) attachment, the message is a disconnect frame, and the one or more additional messages include a General Packet Radio Service (GPRS) attach request. Advantageously, a data connection is substantially seamlessly maintained for the wireless device despite network connection complexities.

The above-described embodiments of the present disclosure are intended to be examples only. Those of skill in the art may effect alterations, modifications and variations to the particular embodiments without departing from the scope of the application. The invention described herein in the recited claims intend to cover and embrace all suitable changes in technology.

The invention claimed is:

1. A method for use in a wireless communication device for communications with a wireless communication network, the method comprising the acts of:

causing a message to be sent to the wireless network for causing data connection parameters of a previous data connection to be reset;

causing a request for a new data connection to be sent to the wireless network after the message is sent; and communicating data over the new data connection with use of new data connection parameters.

2. The method of claim 1, wherein the data connection parameters comprise an encryption parameter.

3. The method of claim 1, wherein the message comprises a disconnect frame.

4. The method of claim 1, wherein the data connection comprises an attachment to the wireless network.

5. The method of claim 1, further comprising:

performing the recited actions in response to a communication failure.

6. The method of claim 1, wherein the data connection comprises a General Packet Radio Service (GPRS) connection.

7. The method of claim 1, wherein a communication failure causes the data connection parameters in the wireless device to be reset without the data connection parameters in the wireless network to be reset.

8. The method of claim 1, which is performed in response to a communication failure with the wireless communication network, the communication failure comprising an out-of-coverage condition between the wireless device and the wireless network.

9. The method of claim 1, which is executed in accordance with computer instructions stored on a computer readable medium by one or more processors for performing the method.

10. The method of claim 1, wherein the message comprises a disconnect frame as defined in a Logical Link Control (LLC) specification.

11. A wireless communication device, comprising:

a radio transceiver;

one or more controllers coupled to the radio transceiver;

the one or more controllers being adapted to:

causing a message to be sent, to the wireless network via the radio transceiver, for causing data connection parameters of a previous data connection to be reset;

causing a request for a new data connection to be sent to the wireless network via the radio transceiver after the message is sent; and communicating data over the new data connection with the wireless network, via the radio transceiver, with use of new data connection parameters.

12. The wireless device of claim 11, wherein the data connection parameters comprise an encryption parameter.

13. The wireless device of claim 11, wherein the message comprises a disconnect frame.

14. The wireless device of claim 11, wherein the one or more controllers are further adapted to maintain the new data connection by maintaining an attachment to the wireless network.

15. The wireless device of claim 11, wherein the one or more controllers are further adapted to, after causing the request to be sent, cause a packet data protocol (PDP) context request to be sent to the wireless network.

16. The wireless device of claim 11, wherein a communication failure occurs which comprises a reset of the wireless device without a successful communication of a detach message to the wireless network.

17. The wireless device of claim 11, wherein a communication failure causes the data connection parameters in the wireless device to be reset without the data connection parameters in the wireless network to be reset.

18. The wireless device of claim 11, which is performed in response to the communication failure which comprises an out-of-coverage condition between the wireless device and the wireless network.

19. The wireless device of claim 11, wherein the data connection comprises a General Packet Radio Service (GPRS) connection.

20. The wireless device of claim 11, wherein the message comprises a disconnect frame as defined in a Logical Link Control (LLC) specification.

* * * * *

UNITED STATES PATENT AND TRADEMARK OFFICE

CERTIFICATE OF CORRECTION

PATENT NO. : 8,060,039 B2
APPLICATION NO. : 12/414252
DATED : November 15, 2011
INVENTOR(S) : Fraser C. Gibbs It is certified that error appears in the above-identified patent and that said Letters Patent is hereby corrected as shown below:

Title page, item (62) Related U.S. Application Data, remove "Continuation of application No. 11/937,215, filed on Nov. 8, 2007, now Pat. No. 7,529,527." and add --Continuation of application No. 11 /937,215, filed on Nov. 8, 2007, now Pat. No, 7,529,527, which is a Continuation of application No. 10/602,969, filed on Jun. 24, 2003, now Pat. No. 7,313,371, which is a Non-provisional of Provisional application No. 60/397,682, filed on Jul. 23, 2002.--

Signed and Sealed this
Twenty-first Day of February, 2012

David J. Kappos
*Director of the United States Patent and Trademark Office*